Patented Nov. 13, 1928.

1,691,345

UNITED STATES PATENT OFFICE.

ROBERT R. FULTON, OF WILKINSBURG, PENNSYLVANIA, ASSIGNOR TO THE KOPPERS COMPANY, A CORPORATION OF PENNSYLVANIA.

DECOLORIZATION OF ALKALINE-EARTH-METAL THIOCYANATE SOLUTIONS.

No Drawing.   Application filed December 31, 1926.   Serial No. 158,422.

This invention relates to a process for decolorizing solutions of alkaline earth metal thiocyanates, and especially calcium thiocyanate solutions used as solvents for cellulose and the like.

At the present time, a cheap and available raw material for the preparation of calcium thiocyanate exists in the waste liquors produced in processes of treating fuel gas for the removal of hydrogen sulphide and hydrogen cyanide by means of alkaline absorbent solutions. It has been observed, however, that calcium thiocyanate prepared from such material contains slight amounts of dye or coloring matter, generally red, and exceedingly difficult to remove. While such foreign material is unobjectionable for many purposes, for others it has been found to be troublesome. For example, in processes for preparation of viscose, in which calcium thiocyanate solutions are used as solvents for cellulose, this coloring matter or dye will have the obvious undesirable effect of coloring the viscose product.

An object of my invention is to provide a process whereby such coloration may be eliminated.

A further object of my invention is to provide a process of eliminating such dye or coloring matter in calcium thiocyanate solutions, irrespective of the use to which such solutions are put.

It is known that the presence of formaldehyde or the like will not diminish the solvent properties of calcium thiocyanate solutions with respect to cellulose and that it may actually aid in the solution of cotton and the like.

I have found that the addition of formaldehyde sodium formate or any similar analogous substance, to a calcium thiocyanate solution accompanied by heating, effectively eliminates such dye or coloring matter and produces a substantially colorless product. I have also found that this action is particularly effective when cellulose is present in the solution. It is known that the presence of frmaldehyde or the like in the viscose product is not deleterious.

My invention is not limited to the specific compounds recited above. Substantially any derivatives of any of the lower fatty acids may be used with good results. The salts, esters and aldehydes of formic and acetic acids may be cited by way of example. However, I prefer to use a derivative of formic acid, such as formaldehyde or sodium formate.

In practicing my invention, I add from 1 to 5% by volume of a 40% formaldehyde solution or from 3 to 5% solution by weight of sodium formate or the equivalent thereof to a calcium thiocyanate solution of suitable strength for the solution of cellulose. The desired amount (generally 4 to 5% by weight) of cotton or other cellulose is then added and the whole is heated to from 120° to 130° C. and maintained at such temperature until the color of the solution has disappeared. This generally requires one hour.

By means of my process, the very troublesome dye in calcium thiocyanate solutions, especially those solutions prepared from gas purification liquors, may be eliminated at very little expense. Furthermore, my invention makes it possible to produce practically colorless solutions of cellulose or viscose by the use of calcium thiocyanate solutions.

My invention is not limited to the specific example herein given by way of illustration but may be variously embodied within the scope of the following claims.

I claim as my invention:

1. The process of decolorizing a solution of an alkaline earth metal thiocyanate which comprises adding thereto a derivative of a water-soluble fatty acid.

2. The process of decolorizing a solution of an alkaline earth metal thiocyanate which comprises adding thereto a derivative of formic acid.

3. The process of decolorizing an alkaline earth metal thiocyanate solution which comprises heating the same in the presence of a derivative of a water-soluble fatty acid.

4. The process of decolorizing an alkaline earth metal thiocyanate solution which comprises heating the same in the presence of a derivative of formic acid.

5. The process of decolorizing a solution of calcium thiocyanate which comprises adding formaldehyde thereto.

6. The process of decolorizing calcium thiocyanate solutions which comprises heating the same in the presence of formaldehyde.

7. The process of decolorizing a solution of calcium thiocyanate which comprises adding thereto from 0.4 to 2.0% by volume of formaldehyde.

8. The process of decolorizing a solution of calcium thiocyanate which comprises heating the same to a temperature of from 120 to 130° C. in the presence of from 0.4 to 2.0% formaldehyde and maintaining the solution at that temperature until the coloration disappears.

9. The process of decolorizing a solution of an alkaline earth metal thiocyanate-containing cellulose in solution which comprises adding thereto a derivative of a water-soluble fatty acid.

10. The process of decolorizing a solution of an alkaline earth metal thiocyanate containing cellulose in solution which comprises adding thereto a derivative of formic acid.

11. The process of decolorizing a solution of calcium thiocyanate containing cellulose in solution which comprises adding formaldehyde thereto.

12. The process of decolorizing calcium thiocyanate solutions containing cellulose in solution which comprises heating the same in the presence of formaldehyde.

13. The process of decolorizing a solution of calcium thiocyanate containing cellulose in solution which comprises adding thereto from 0.4 to 2.0% by volume of formaldehyde.

14. The process of decolorizing a solution of calcium thiocyanate containing cellulose in solution which comprises heating the same to a temperature of from 120° to 130° C. in the presence of from 0.4 to 2.0% formaldehyde and maintaining the solution at that temperature until the coloration disappears.

15. The process of obtaining a colorless solution of cellulose which comprises dissolving the cellulose in a solution of calcium thiocyanate containing formaldehyde and heating the solution thus formed until it becomes colorless.

16. The process of obtaining a colorless solution of cellulose which comprises dissolving the cellulose in a solution of calcium thiocyanate containing formaldehyde and heating from 120° to 130° C. the solution thus formed until it becomes colorless.

In testimony whereof, I have hereunto subscribed my name this 29th day of December 1926.

ROBERT R. FULTON.